United States Patent [19]
Chikuma

[11] Patent Number: 4,671,623
[45] Date of Patent: Jun. 9, 1987

[54] ASPHERIC OBJECT LENS FOR OPTICAL DATA READ-OUT APPARATUS

[75] Inventor: Kiyofumi Chikuma, Tokorozawa, Japan

[73] Assignee: Pioneer Electronic Corporation, Tokyo, Japan

[21] Appl. No.: 840,734

[22] Filed: Mar. 18, 1986

[30] Foreign Application Priority Data

Mar. 20, 1985 [JP] Japan .................... 60-58025

[51] Int. Cl.$^4$ .................. G02B 13/18; G02B 21/02
[52] U.S. Cl. ...................... 350/432; 350/414
[58] Field of Search .............. 350/432–435, 350/414

[56] References Cited

U.S. PATENT DOCUMENTS

| | | | |
|---|---|---|---|
| 4,027,952 | 6/1977 | Hugues | 350/432 |
| 4,525,040 | 6/1985 | Nakamura | 350/432 X |
| 4,595,264 | 6/1986 | Nakamura | 350/432 X |
| 4,600,276 | 7/1986 | Bietry | 350/432 |
| 4,613,212 | 9/1986 | Norikazu | 350/432 |

*Primary Examiner*—John K. Corbin
*Assistant Examiner*—Scott J. Sugarman
*Attorney, Agent, or Firm*—Fleit, Jacobson, Cohn & Price

[57] ABSTRACT

An object lens for use in focusing a laser light beam onto a recording surface in an optical data read-out apparatus, is formed with opposing refracting aspheric surfaces which are shaped in accordance with new aspheric surface equations, whereby the shapes of the aspheric surfaces are simple and readily formed. The thickness of the lens can be made smaller than is possible with prior art types of such lens, although satisfactory values for the degree of aberration correction and focal distance are maintained.

1 Claim, 5 Drawing Figures

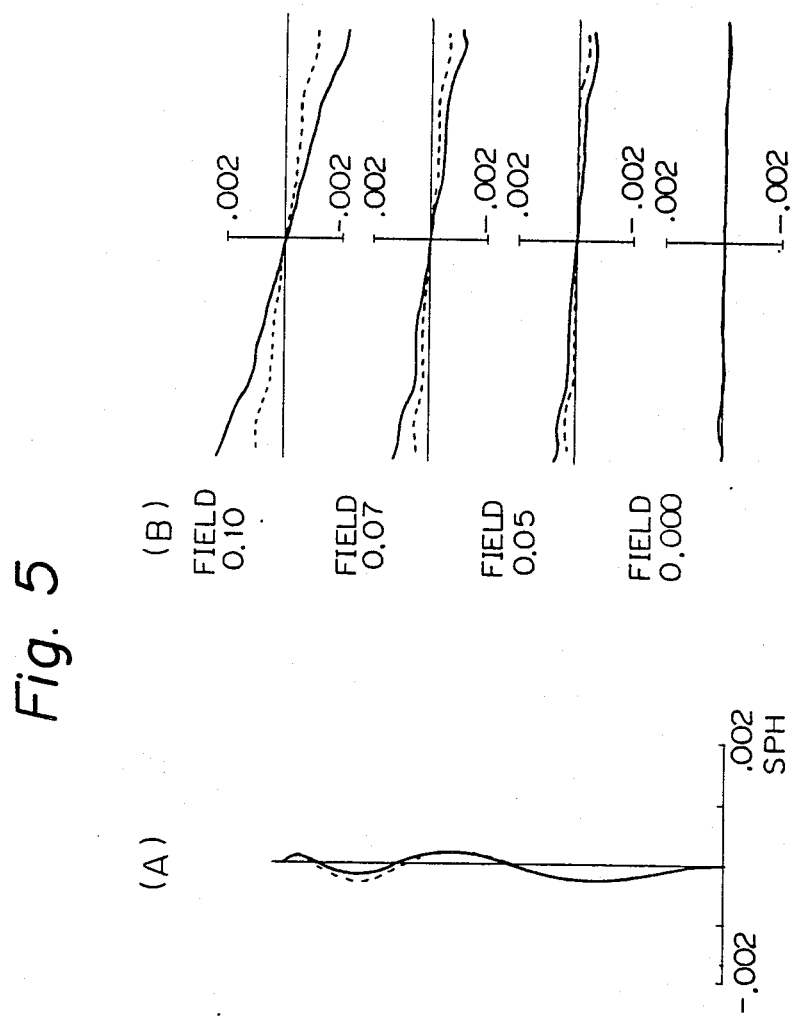

ASPHERIC OBJECT LENS FOR OPTICAL DATA READ-OUT APPARATUS

BACKGROUND OF THE INVENTION

The present invention relates to an object lens for an optical data read-out apparatus.

An aspheric surface lens having a large aperture ratio, suitable for use as the object lens of an optical data read-out apparatus such as a video disc player, has been disclosed in Japanese patent No. 57-76512. FIG. 1 shows the lens which is described in that patent. In FIG. 1, a laser light beam 3 emitted from a light source such as a laser tube (not shown in the drawings) is refracted by an object lens 1, to be transmitted through a substrate 2a of a recording disc 2, and thereby form a spot of light upon a recording surface 2b. Data read-out is performed by sensing variations in the resultant level of light which is reflected from or is transmitted through the recording surface 2b. The incident laser light beam 3 first falls upon a refracting aspheric surface $S_1$ of object lens 1, which satisfies the following aspheric surface equation:

$$X = \frac{C_1 Y^2}{1 + \sqrt{1 - (1 + K_1)C_1^2 Y^2}} + A_4 Y^4 + A_6 Y^6 + A_8 Y^8 \quad (1)$$

in which Y denotes height measured from the optical axis of the lens, X denotes the distance, from a point whose height above the optical axis is Y, to a plane which tangentially contacts the apex of the first refracting surface $S_1$, $C_1$ is the curvature at the apex of $S_1$, and $K_1$, $A_4$, $A_6$ and $A_8$ are aspheric surface coefficients.

The second refracting surface $S_2$, which faces the recording disc 2, is formed such as to satisfy the following aspheric surface equation:

$$X = \frac{C_2 Y^2}{1 + \sqrt{1 - (1 + K_2)C_2^2 Y^2}} \quad (2)$$

where $C_2$ is the curvature at the apex of the second refracting surface $S_2$, and $K_2$ is an aspheric surface coefficient of surface $S_2$. The aspheric surface coefficients $K_1$, $A_4$, $A_6$, $A_8$ and $K_2$ may for example take the following respective values:

$$K_1 = -2.41688 \quad (3)$$

$$A_4 = 0.62875 \times 10^{-2} \quad (4)$$

$$A_6 = -0.21838 \times 10^{-3} \quad (5)$$

$$A_8 = 0.67164 \times 10^{-5} \quad (6)$$

$$K_2 = -149.999 \quad (7)$$

In addition, the radius of curvature $r_1 (= 1/C_1)$ of the first refracting surface $S_1$ at the apex of that surface, the radius of curvature $r_2 (= 1/C_2)$ of the second refracting surface $S_2$ at the apex of that surface, the distance between the apexes of the first and second refracting surfaces $S_1$ and $S_2$ (i.e. the thickness d of object lens 1), the distance between the second refracting surfaces $S_2$ and the recording disc 2 (i.e. the working distance WD), and the index of refraction $n_1$ of object lens 1, can, for example, take the following values, respectively:

$$r_1 = 3.3710 \text{ (mm)} \quad (8)$$

$$r_2 = -14.768 \text{ (mm)} \quad (9)$$

$$d = 4.0 \text{ (mm)} \quad (10)$$

$$WD = 1.400 \text{ (mm)} \quad (11)$$

$$n_1 = 1.70214 \text{ (mm)} \quad (12)$$

The numerical aperture NA of such a lens has a value in the range of approximately 0.45 to 0.5, in order to provide a resolution of approximately 1,000 lines/mm, and correction for aberration is performed such as to hold residual aberration within the refraction boundary.

With such a prior art type of object lens, it is necessary for the focal distance f of the lens to satisfy the following conditions, in order to enable a sufficiently large value of working distance WD to be employed, while incorporating a sufficient degree of correction for aberration:

$$1.45 < \frac{d}{(n_1 - 1)} < 1.65 \quad (13)$$

In order to satisfy the above relationship (13), the focal distance f must be made relatively large. If the condition (13) is not satisfied, then it will not be possible to implement correction for astigmatic aberration. The necessity to satisfy condition (13) above makes it necessary for the object lens to be made large in size, if satisfactory correction for aberration is to be achieved and if a sufficiently large working distance WD is to be attained. Thus, it is difficult to make such a lens compact and light in weight.

Furthermore, with such a prior art type of object lens, both of the refracting surfaces $S_1$ and $S_2$ of the lens must be made to follow a relatively complex aspheric curvature, so that manufacture of such a lens is difficult.

SUMMARY OF THE INVENTION

It is an objective of the present invention to provide an object lens for an optical data read-out apparatus, whereby satisfactory correction of aberration is attained while in addition the lens can be made compact and light in weight, and moreover whereby the operation distance can be made large and further whereby the lens can be easily manufactured.

An object lens for an optical data read-out apparatus according to the present invention is formed with a first and a second refracting aspheric surface having a common optical axis. Designating the aspheric surface coefficients of the first and the second refracting aspheric surface as $A_4^{(1)}Y^4$, $A_6^{(1)}Y^6$, $A_8^{(1)}Y^8$, $A_{10}^{(1)}Y^{10}$, and $A_4^{(2)}Y^4$, $A_6^{(2)}Y^6$, $A_8^{(2)}Y^8$, $A_{10}^{(2)}Y^{10}$, respectively, these refracting aspheric surfaces must satisfy the following aspheric surface equations (14) and (15) respectively:

$$X = \frac{C_1 Y^2}{1 + \sqrt{1 - K_1 C_1^2 Y^2}} + A_4^{(1)}Y^4 + A_6^{(1)}Y^6 + A_8^{(1)}Y^8 + A_{10}^{(1)}Y^{10} \quad (14)$$

-continued $$X = \frac{C_2 Y^2}{1 + \sqrt{1 - K_2 C_2^2 Y^2}} + A_4^{(2)} Y^4 + A_6^{(2)} Y^6 + A_8^{(2)} Y^8 + A_{10}^{(2)} Y^{10} \quad (15)$$

and must also satisfy the following conditions:

$$\frac{(n_1 - 1)f}{r_2} - 10 A_4^{(2)} - 100 A_6^{(2)} > \frac{r_1}{r_2} > \frac{(n_1 - 1)f}{r_2} - \quad (16)$$

$$10 A_4^{(2)} - 100 A_6^{(2)} - 1000 (A_8^{(2)} - A_{10}^{(2)})$$

$$K_1 - \frac{2(n_1 + 2)(n_1 - 1)}{n_1(2n_1 + 1)} < \frac{K_1}{K_2} \quad (17)$$

BRIEF DESCRIPTION OF THE DRAWINGS

FIG. 3(a), 3(b), 4(a), 4(b) and 5(a), 5(b) are graphs illustrating the characteristics of three embodiments of aspheric object lenses according to the present invention.

DESCRIPTION OF THE PREFERRED EMBODIMENTS

Figure 1:
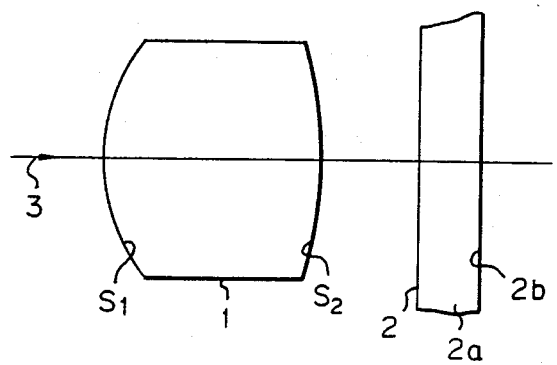
FIG. 1 is a cross-sectional view of a prior art example of an aspheric object lens.
Figure 2:
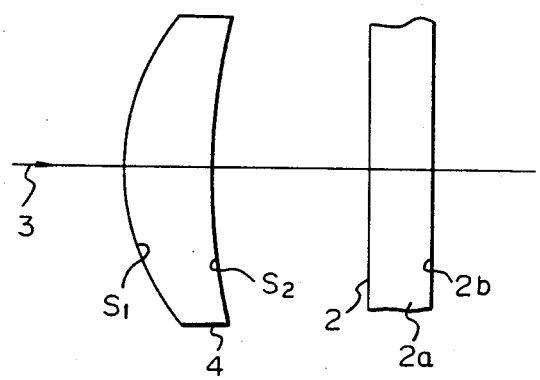
FIG. 2 is a cross-sectional view of an embodiment of an aspheric object lens according to the present invention.

FIG. 2 shows a cross-sectional view of an embodiment of an object lens according to the present invention, denoted by reference numeral 4, which is disposed opposite a recording disc 2 as in the case of the prior art object lens example of FIG. 1. A laser light beam 3 is incident on a first refracting aspheric surface $S_1$ of object lens 4, which is shaped such as to satisfy equation (14) herein above, and passes outward through a second refracting aspheric surface $S_2$, which faces the recording disc 2 and is shaped such as to satisfy equation (15) hereih above. In addition, the pair of refracting aspheric surfaces $S_1$ and $S_2$ satisfy the relationships (16) and (17) given hereinabove. The relationship (16) expresses the conditions which are necessary to suppress high-order aspheric quantites to a low level, and to suppress the generation of coma aberration. Relationship (17) expresses the conditions for holding the overall aspheric surface quantities to low levels, and for eliminating unnecessary aspheric surafce portions, to thereby enable the aspheric surfaces to be easily formed.

TABLE 1

|  | First numeric example | Second numeric example | Third numeric example |
| --- | --- | --- | --- |
| $n_1$ | 1.511 | 1.616 | 1.787 |
| $r_1$ (mm) | 2.734 | 2.980 | 3.386 |
| $K_1$ | 0.479 | 0.359 | 0.581 |
| $A_4^{(1)}$ | $0.24 \times 10^{-4}$ | $0.812 \times 10^{-3}$ | $-0.259 \times 10^{-4}$ |
| $A_6^{(1)}$ | $0.112 \times 10^{-3}$ | $-0.641 \times 10^{-4}$ | $-0.431 \times 10^{-4}$ |
| $A_8^{(1)}$ | $0.238 \times 10^{-4}$ | $0.236 \times 10^{-4}$ | $0.562 \times 10$ |
| $A_{10}^{(1)}$ | $-0.358 \times 10$ | $-0.320 \times 10$ | $-0.126 \times 10$ |
| $r_2$ (mm) | $-7.495$ | $-17.95$ | 198.9 |
| $K_2$ | $-14.92$ | $-1.492$ | 7.43 |
| $A_4^{(2)}$ | $0.390 \times 10^{-2}$ | $0.343 \times 10^{-2}$ | $0.133 \times 10^{-2}$ |
| $A_6^{(2)}$ | $-0.873 \times 10^{-3}$ | $-0.525 \times 10^{-3}$ | $-0.260 \times 10^{-3}$ |
| $A_8^{(2)}$ | $0.127 \times 10^{-3}$ | $0.556 \times 10^{-4}$ | $0.125 \times 10^{-4}$ |
| $A_{10}^{(2)}$ | $-0.130 \times 10^{-4}$ | $0.620 \times 10$ | $0.215 \times 10$ |
| d (mm) | 3.0 | 2.5 | 2.65 |
| WD (mm) | 1.90 | 2.12 | 2.01 |
| f | 4.35 | 4.35 | 4.35 |
| N.A. | 0.53 | 0.53 | 0.53 |

TABLE 1-continued

|  | First numeric example | Second numeric example | Third numeric example |
| --- | --- | --- | --- |
| $n_2$ | 1.49 | 1.49 | 1.49 |
| t (mm) | 1.25 | 1.25 | 1.25 |

Specific numeric values for three embodiments of an object lens according to the present invention are given in Table 1 above, in which $n_3$ denotes the index of refraction of the substrate 2a, and t denotes the thickness of substrate 2a.

Figure 3:
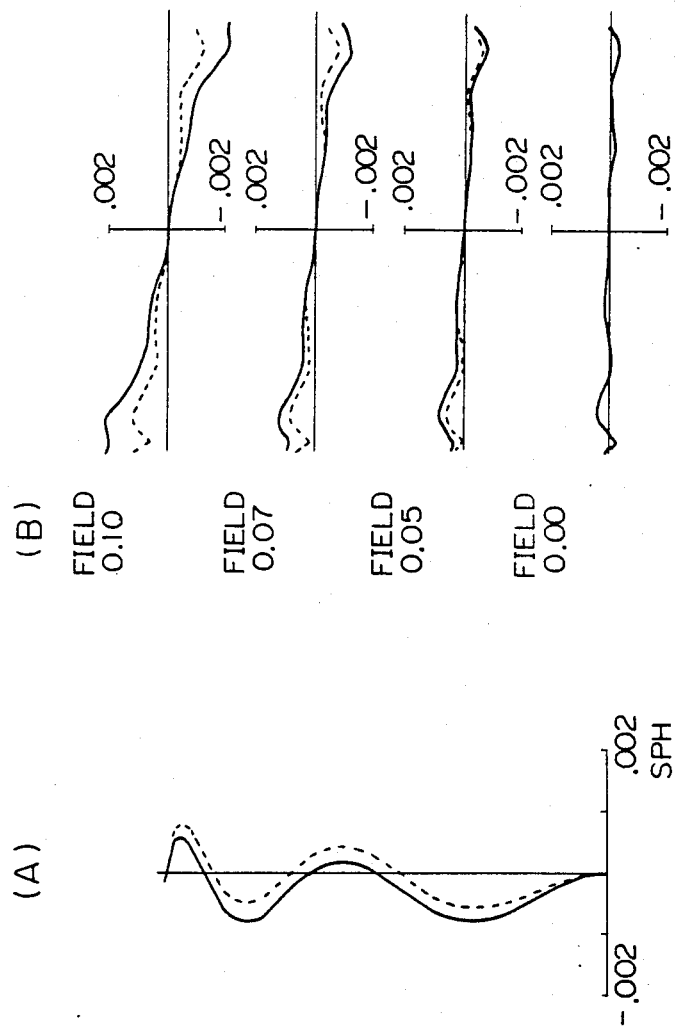
Figure 4:
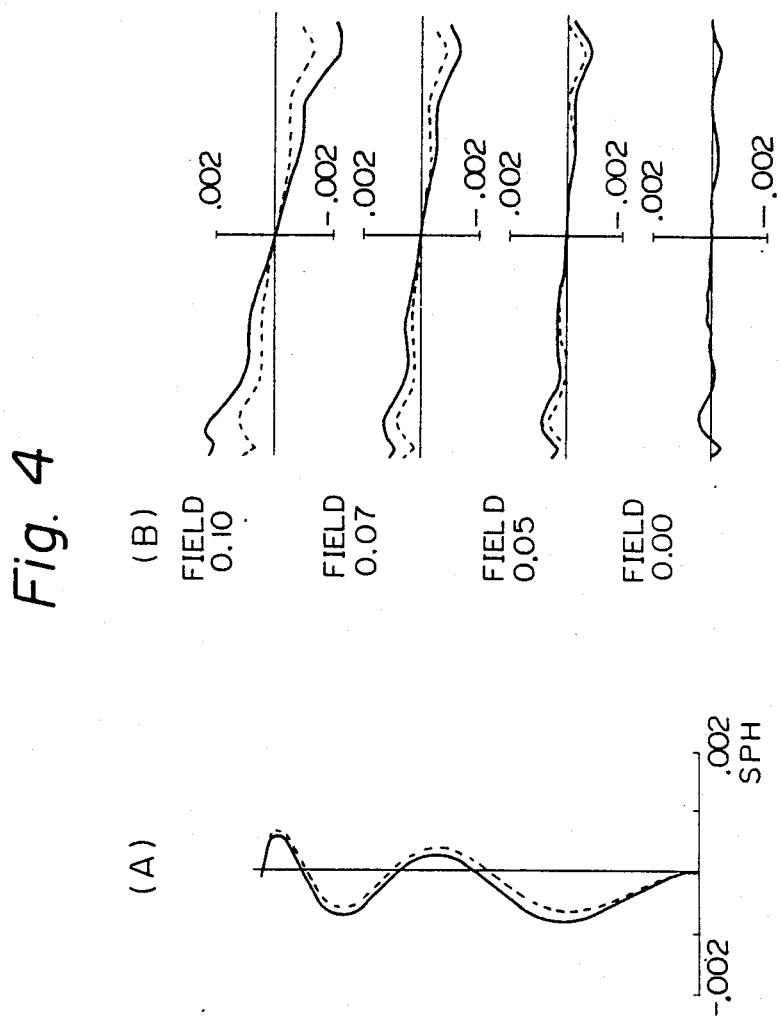

FIGS. 3(a) and 3(b) show results obtained for spherical aberration and for coma aberration respectively, for an embodiment of an object lens according to the present invention employing the first set of numeric values in Table 1 above, while FIGS. 4(a) and 4(b) show corresponding aberration characteristics for an embodiment of an object lens according to the present invention employing the second set of numeric values in Table 1, and FIGS. 5(a) and 5(b) show corresponding aberration characteristics for an embodiment of an object lens according to the present invention employing the third set of numeric values in Table 1.

It is clear from FIGS. 3(a), 3(b) to 5(a), 5(b) that embodiments of object lenses according to the present invention based on any of the three sets of numeric values of Table 1 above will provide a satisfactory degree of correction for aberration, in an optical system which includes the substrate of a recording disc, and that the degree of correction which is attained for off-axis aberration is completely satisfactory for practical use.

As described hereinabove, an object lens according to the present invention is formed with first and second refracting aspheric surfaces which respectively meet the conditions set by equations (14) and (15) above, and which also satisfy the relationships (16) and (17) above. It will be apparent that the present invention enables the thickness d of such an object lens to be made smaller than is possible with prior art types of such lens, while enabling a satisfactory degree of aberration correction to be attained. Thus, the present invention enables such an object lens to be made more compact and light in weight than has been possible hitherto, while enabling a large value of working distance to be employed. Furthermore, it is not necessary to form an object lens according to the present invention with special shapes of aspheric surface, e.g. with elliptical surfaces, such as are required by prior art examples of such a lens, and more simple and generally-employed shapes of aspheric surface can be utilized. As a result, the permissible limits of deviation of the central thickness of an object lens according to the present invention can be increased, whereby manufacturing productivity can be enhanced.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. An object lens for an optical data read-out apparatus, comprising first and second refracting aspheric surfaces having a common optical axis, wherein said first-refracting aspheric surface satisfies the following aspheric surface equation in which Y denotes height measured from said optical axis, X denotes a distance from a point whose height above the optical axis is Y to a plane which tangentially contacts the apex of said first refracting aspheric surface, $C_1$ is the curvature of said first refracting aspheric surface at the apex thereof, and $K_1$, $A^{(1)}_4$, $A^{(1)}_6$, $A^{(1)}_{10}$ are constants:

$$X = \frac{C_1 Y^2}{1 + \sqrt{1 - K_1 C_1^2 Y^2}} + A^{(1)}_4 Y^4 + A^{(1)}_6 Y^6 + A^{(1)}_8 Y^8 + A^{(1)}_{10} Y^{10}$$

and in which said second refracting aspheric surface satisfies the following aspheric surface equation:

$$X = \frac{C_2 Y^2}{1 + \sqrt{1 - K_2 C_2^2 Y^2}} + A^{(2)}_4 Y^4 + A^{(2)}_6 Y^6 + A^{(2)}_8 Y^8 + A^{(2)}_{10} Y^{10}$$

where $C_2$ is the curvature of said second refracting aspheric surface at the apex thereof, and $K_1$, $A^{(2)}_4$, $A^{(2)}_6$, $A^{(2)}_{10}$ are constant, and furhter in which said first and second refracting aspheric surfaces satisfy the following equations:

$$\frac{(n-1)f}{r_2} - 10 A^{(2)}_4 - 100 A^{(2)}_6 > \frac{r_1}{r_2} > \frac{(n-1)f}{r_2} -$$
$$10 A^{(2)}_4 - 100 A^{(2)}_6 - 1000 (A^{(2)}_8 - A^{(2)}_{10})$$

and $$\text{and } K_1 - \frac{2(n+2)(n-1)}{n(2n+1)} < \frac{K_1}{K_2}$$

in which n denotes the index of refraction of said object lens, f denotes the focal distance of said object lens, $r_1$ denotes the curvature at the apex of said first refracting aspheric surface and $r_2$ denotes the curvature at the apex of said second refracting aspheric surface.

* * * * *